(12) United States Patent
Lim et al.

(10) Patent No.: US 10,749,659 B2
(45) Date of Patent: *Aug. 18, 2020

(54) METHODS AND APPARATUS FOR TRANSMITTING/RECEIVING HE-LTF

(71) Applicant: LG ELECTRONICS INC., Seoul (KR)

(72) Inventors: Dongguk Lim, Seoul (KR); Wookbong Lee, Seoul (KR); Jinsoo Choi, Seoul (KR); Hangyu Cho, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/248,432

(22) Filed: Jan. 15, 2019

(65) Prior Publication Data

US 2019/0222401 A1    Jul. 18, 2019

Related U.S. Application Data

(63) Continuation of application No. 15/518,736, filed as application No. PCT/KR2015/012473 on Nov. 19, 2015, now Pat. No. 10,225,064.

(Continued)

(51) Int. Cl.
*H04L 5/00* (2006.01)
*H04L 27/26* (2006.01)
(Continued)

(52) U.S. Cl.
CPC ......... *H04L 5/0091* (2013.01); *H04B 7/0452* (2013.01); *H04L 5/0007* (2013.01);
(Continued)

(58) Field of Classification Search
CPC ... H04L 5/0091; H04L 5/0023; H04L 5/0048; H04L 5/0051; H04L 69/324;
(Continued)

(56) References Cited

U.S. PATENT DOCUMENTS

2010/0309834 A1   12/2010   Fischer et al.
2011/0299382 A1   12/2011   Van Nee et al.
(Continued)

OTHER PUBLICATIONS

United States Patent and Trademark Office U.S. Appl. No. 15/518,736, Office Action dated Jun. 4, 2018, 13 pages.
(Continued)

*Primary Examiner* — Thai Nguyen
(74) *Attorney, Agent, or Firm* — Lee Hong Degerman Kang Waimey

(57) ABSTRACT

A method and apparatus for transmitting frames having a long training field (LTF) for a second type of station (STA) in a wireless communication system are provided. For this, STA prepares a frame having a first part for a first type of STA and a second part for the second type of STA; wherein the second part includes multiple LTFs, when the frame is used for MU (Multiple User) transmission scheme or OFDMA (Orthogonal Frequency Divisional Multiple Access) scheme. In case a first LTF having a first number of symbols length and a second LTF having a second number of symbols length, which is greater than the first number of symbols length, are used for the multiple LTFs, the first LTF is extended such that the first LTF and the second LTF have a same number of symbols length. The STA transmits the prepared frame to one or more STAs.

10 Claims, 11 Drawing Sheets

| L-STF | L-LTF | L-SIG | HE-SIG A |         | HE-STF | HE-LTF | Data for STA1 |
| L-STF | L-LTF | L-SIG | HE-SIG A | HE-SIG B | HE-STF | HE-LTF | Data for STA2 |
| L-STF | L-LTF | L-SIG | HE-SIG A |         | HE-STF | HE-LTF | Data for STA3 |
| L-STF | L-LTF | L-SIG | HE-SIG A |         | HE-STF | HE-LTF | Data for STA4 |

Related U.S. Application Data

(60) Provisional application No. 62/143,822, filed on Apr. 7, 2015, provisional application No. 62/135,109, filed on Mar. 18, 2015, provisional application No. 62/081,582, filed on Nov. 19, 2014.

(51) Int. Cl.
*H04B 7/0452* (2017.01)
*H04L 29/08* (2006.01)
*H04W 84/12* (2009.01)

(52) U.S. Cl.
CPC .......... *H04L 5/0023* (2013.01); *H04L 5/0048* (2013.01); *H04L 5/0051* (2013.01); *H04L 27/261* (2013.01); *H04L 69/324* (2013.01); *H04L 5/0039* (2013.01); *H04W 84/12* (2013.01)

(58) Field of Classification Search
CPC ... H04L 5/0007; H04L 27/261; H04L 5/0039; H04B 7/0452; H04W 84/12
See application file for complete search history.

(56) References Cited

U.S. PATENT DOCUMENTS

| | | | |
|---|---|---|---|
| 2011/0305176 A1 | 12/2011 | Wentink | |
| 2012/0147866 A1* | 6/2012 | Stacey | H04L 5/0048 370/338 |
| 2012/0269124 A1 | 10/2012 | Porat | |
| 2013/0229996 A1 | 9/2013 | Wang et al. | |
| 2013/0301551 A1 | 11/2013 | Ghosh et al. | |
| 2015/0365263 A1* | 12/2015 | Zhang | H04B 7/066 375/295 |
| 2016/0056930 A1* | 2/2016 | Seok | H04L 5/0026 370/330 |
| 2016/0088126 A1* | 3/2016 | Doan | H04L 69/22 370/329 |
| 2017/0237543 A1 | 8/2017 | Lim et al. | |

OTHER PUBLICATIONS

PCT International Application No. PCT/KR2015/012473, Notification of Transmittal of the International Search Report and the Written Opinion of the International Searching Authority, or Declaration dated Feb. 29, 2016, 10 pages.

European Patent Office Application Serial No. 15861446.1, Search Report dated Jun. 13, 2018, 12 pages.

Seok, Y. et al., "HEW PPDU Format for Supporting MIMO-OFDMA", doc.: IEEE 802.11-14/1210r0, XP068071034, Sep. 2014, 16 pages.

Schelstraete, S. et al., "Protocol and signaling framework for OFDMA", doc.: IEEE 802.11-14/1433r0, XP068118062, Nov. 2014, 12 pages.

* cited by examiner

FIG. 5

| L-STF | L-LTF | L-SIG | HE-SIG A | HE-STF | HE-LTF | HE-SIG B | Data |
|-------|-------|-------|----------|--------|--------|----------|------|
| L-STF | L-LTF | L-SIG | HE-SIG A | | | | |
| L-STF | L-LTF | L-SIG | HE-SIG A | | | | |
| L-STF | L-LTF | L-SIG | HE-SIG A | | | | |

FIG. 6

| L-LTF | L-STF | L-SIG | Data |
|-------|-------|-------|------|

PPDU format (IEEE 802.11a/g)

| L-LTF | L-STF | L-SIG | VHT-SIG A | HT-STF | HT-LTF | ⋯ | HT-LTF | Data |
|-------|-------|-------|-----------|--------|--------|---|--------|------|

HT PPDU format (IEEE 802.11n)

| L-LTF | L-STF | L-SIG | VHT-SIG A | VHT-SFT | VHT-LTF | VHT-SIG B | Data |
|-------|-------|-------|-----------|---------|---------|-----------|------|

VHT PPDU format (IEEE 802.11ac)

FIG. 7

| L-STF | L-LTF | L-SIG | HE-SIG A | HE-SIG B | HE-STF | HE-LTF | Data |
|-------|-------|-------|----------|----------|--------|--------|------|
| L-STF | L-LTF | L-SIG | HE-SIG A | | | | |
| L-STF | L-LTF | L-SIG | HE-SIG A | | | | |
| L-STF | L-LTF | L-SIG | HE-SIG A | | | | |

FIG. 10

| Legacy Preamble | Full-20MHz HE Preamble (RLSIG, HESIGA, HESIGB) | HE-STF | HE-LTF | | OFDMA-User-1 (Nsts_1) |
|---|---|---|---|---|---|
| | | HE-STF | HE-LTF | | OFDMA-User-2 (Nsts_2) |
| | | HE-STF | HE-LTF | | OFDMA-User-3 (Nsts_3) |
| | | HE-STF | HE-LTF | | OFDMA-User-4 (Nsts_4) |

N_HELTF symbols

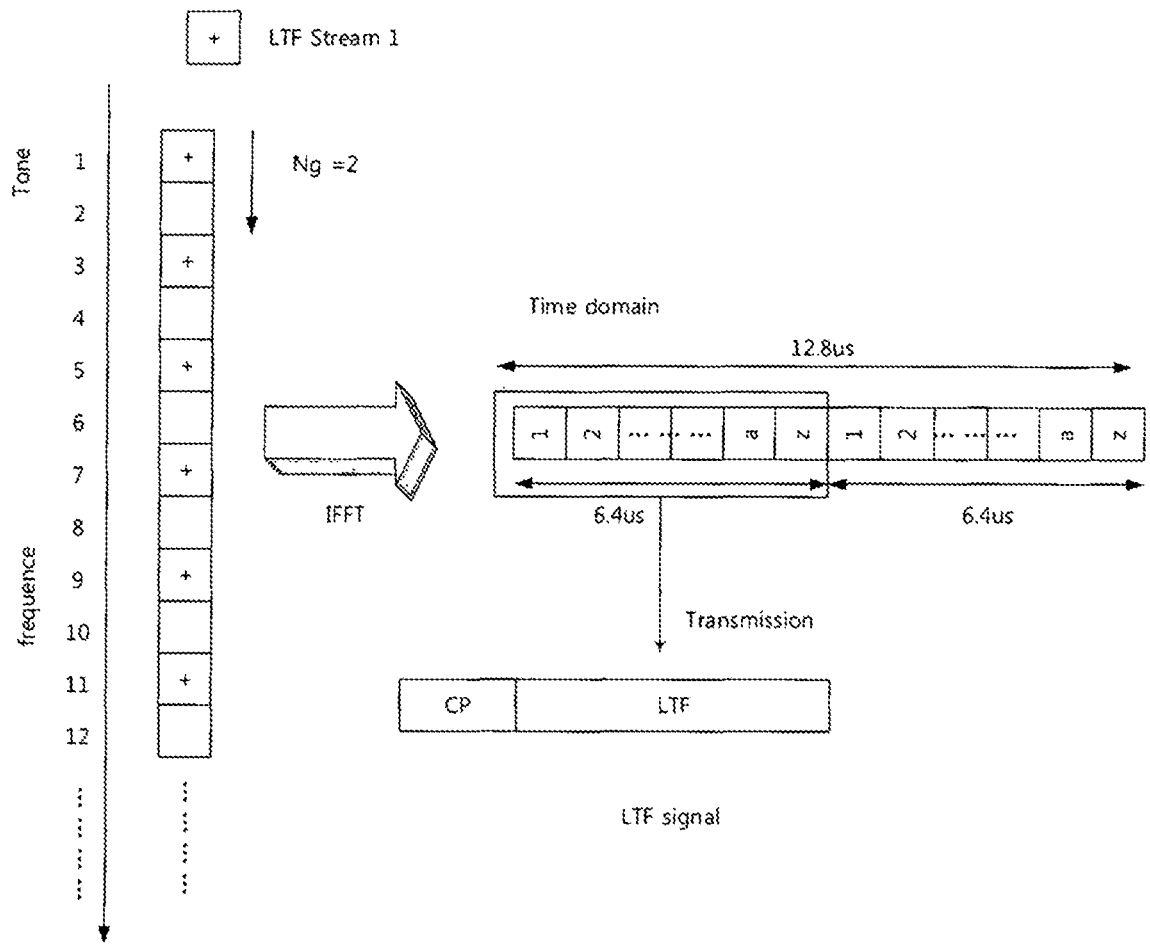

FIG. 14

$$\tilde{P}_{6\times 6} = \begin{bmatrix} 1 & -1 & 1 & 1 & 1 & -1 \\ 1 & -w & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix} \begin{matrix} \left.\vphantom{\begin{matrix}1\end{matrix}}\right\}\text{P for Nsts=1} \\ \left.\vphantom{\begin{matrix}1\\1\\1\end{matrix}}\right\}\text{P for Nsts=3} \\ \left.\vphantom{\begin{matrix}1\\1\end{matrix}}\right\}\text{P for Nsts=5} \end{matrix}$$

FIG. 15

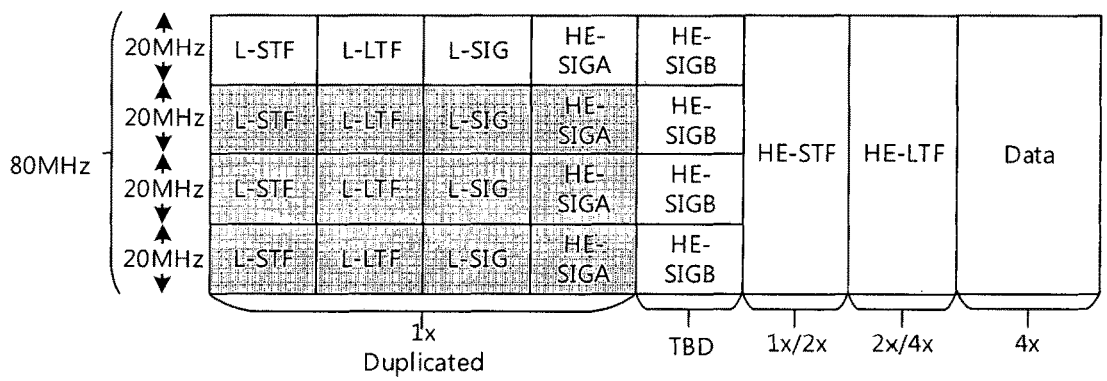

FIG. 16

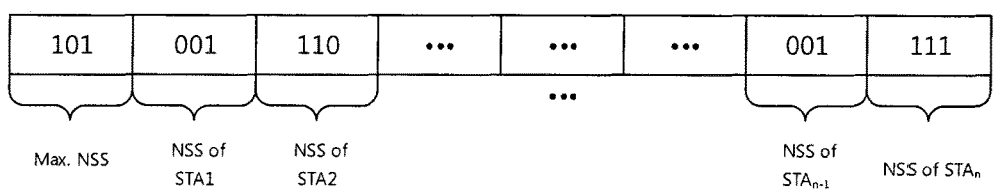

METHODS AND APPARATUS FOR TRANSMITTING/RECEIVING HE-LTF

CROSS-REFERENCE TO RELATED APPLICATIONS

This application is a continuation of U.S. patent application Ser. No. 15/518,736, filed on Apr. 12, 2017, now U.S. Pat. No. 10,225,064, which is the National Stage filing under 35 U.S.C. 371 of International Application No. PCT/KR2015/012473, filed on Nov. 19, 2015, which claims the benefit of U.S. Provisional Application No. 62/081,582, filed on Nov. 19, 2014, 62/135,109, filed on Mar. 18, 2015 and 62/143,822, filed on Apr. 7, 2015, the contents of which are all hereby incorporated by reference herein in their entirety.

TECHNICAL FIELD

The following description is related with a wireless communication system, and more specifically, with methods and apparatus for transmitting/receiving frames including HE-LTF in a Wireless Local Access Network (WLAN) system.

BACKGROUND ART

Various wireless communication technologies systems have been developed with rapid development of information communication technologies. WLAN technology from among wireless communication technologies allows wireless Internet access at home or in enterprises or at a specific service provision region using mobile terminals, such as a Personal Digital Assistant (PDA), a laptop computer, a Portable Multimedia Player (PMP), etc. on the basis of Radio Frequency (RF) technology.

In order to obviate limited communication speed, one of the advantages of WLAN, the recent technical standard has proposed an evolved system capable of increasing the speed and reliability of a network while simultaneously extending a coverage region of a wireless network. For example, Institute of Electrical and Electronics Engineers (IEEE) 802.11n enables a data processing speed to support a maximum high throughput (HT) of 540 Mbps. In addition, Multiple Input and Multiple Output (MIMO) technology has recently been applied to both a transmitter and a receiver so as to minimize transmission errors as well as to optimize a data transfer rate.

Furthermore, IEEE 802.11ac standard mostly operates in a 5 GHz band and provides a data rate of 1 Gbit/s or more. IEEE 802.11ac supports downlink Multi-User Multiple Input Multiple Output (MU-MIMO). A system that supports IEEE 802.11ac is called a Very High Throughput (VHT) system.

IEEE 802.11ax is being developed as a next-generation WLAN for handling a higher data rate and a higher user load. The scope of IEEE 802.11ax may include 1) the improvements of the 802.11 physical (PHY) layer and the Medium Access Control (MAC) layer, 2) the improvements of spectrum efficiency and area throughput, 3) performance improvement in an environment under an interference source, a crowded heterogeneous network environment, and an environment having heavy user load.

A proposed WLAN system may operate in a frequency band of 6 GHz or less or a frequency band of 60 GHz. The frequency band of 6 GHz or less may include at least one of a 2.4 GHz band and a 5 GHz band.

DISCLOSURE

Technical Problem

There are discussions on a frame structure to support IEEE 802.11ax technology. Specifically, when the system provides MU/OFDMA services to users, multiple Long Training Fields for 11ax STA (HE-LTFs) may have different symbol length in time domain because of supporting of different number of spatial streams. It may cause interference among users because the length of LTF for each STA is not aligned.

One object of the present invention is to provide methods and apparatus for transmission/reception of frames including HE-LTF which is aligned to address the above problem.

It is to be understood that technical objects to be achieved by the present invention are not limited to the aforementioned technical object and other technical objects which are not mentioned herein will be apparent from the following description to one of ordinary skill in the art to which the present invention pertains.

Technical Solution

The object of the present invention can be achieved by providing a method for transmitting frames having a long training field (LTF) for a second type of station (STA) in a wireless communication system, the method comprising: preparing a frame having a first part for a first type of STA and a second part for the second type of STA, wherein the second part includes multiple LTFs, when the frame is used for MU (Multiple User) transmission scheme or OFDMA (Orthogonal Frequency Divisional Multiple Access) scheme, wherein, in case a first LTF having a first number of symbols length and a second LTF having a second number of symbols length, which is greater than the first number of symbols length, are to be used for the multiple LTFs, the first LTF is extended such that the first LTF and the second LTF have a same number of symbols length; and transmitting the prepared frame to one or more STAs.

Here, one or more of the first LTF and the second LTF can be extended such that the first LTF and the second LTF have a number of symbols equals to a maximum number of symbols of the multiple LTFs.

Preferably, the multiple LTFs can be aligned in a time domain within the same number of symbols.

A length of one symbol of the first LTF and the second LTF might be 'X' times greater than a length of one symbol of the first part, wherein 'X' is an integer greater than 2. X can be 2 or 4, and a value of 'X' can be informed by signaling field of the second part.

Preferably, in case the maximum number of symbols of the multiple LTFs is not integer multiple of the first number of symbols, a part of the first LTF can be used for extension to the maximum number of symbols.

In one example, each of the multiple LTFs can have a sequence generated by multiplying a LTF sequence with a corresponding row of a P matrix.

Preferably, in case Nsts LTF streams having Nsts symbol length is used for a specific STA, a LTF for the specific STA can be generated by using first Nsts rows of the P matrix having 'Nmax'*'Nmax' structure, and wherein 'Nmax' is a maximum number of symbols of the multiple LTFs.

In another aspect of the present invention, the above problem can be solved by a station configured to transmit frames having a long training field (LTF) for a second type of station (STA) in a wireless communication system, the station comprising: a processor configured to prepare a frame having a first part for a first type of STA and a second part for the second type of STA, wherein the second part includes multiple LTFs, when the frame is used for MU (Multiple User) transmission scheme or OFDMA (Orthogonal Frequency Divisional Multiple Access) scheme, wherein, in case a first LTF having a first number of symbols length and a second LTF having a second number of symbols length, which is greater than the first number of symbols length, are used for the multiple LTFs, the first LTF is extended such that the first LTF and the second LTF have a same number of symbols length; and a transceiver connected to the processor and configured to transmit the prepared frame to one or more STAs.

The processor can be further configured to extend one or more of the first LTF and the second LTF such that the first LTF and the second LTF have a number of symbols equals to a maximum number of symbols of the multiple LTFs.

The processor may be further configured to align the multiple LTFs in a time domain within the same number of symbols.

Also, the station may further comprise: a memory connected to the processor and storing P matrixes for each number of streams.

The processor may prepare sequences for each of the multiple LTFs by multiplying a LTF sequence with a corresponding row of a P matrix.

Preferably, in case Nsts LTF streams having Nsts symbol length is used for a specific STA, the processor generates a LTF for the specific STA by using first Nsts rows of the P matrix having 'Nmax'*'Nmax' structure, and wherein 'Nmax' is a maximum number of symbols of the multiple LTFs.

Advantageous Effects

According to the present invention, 802.11ax system can provide DL/UL OFDMA and/or MU transmission without causing misalignment of HE-LTFs.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 5 illustrates an example of a proposed PPDU format for IEEE 802.11ax.

FIG. 6 illustrates various PPDU formats according to IEEE 802.11a/g/n/ac for easy reference.

FIG. 7 illustrates another example of a proposed PPDU format for IEEE 802.11ax.

FIG. 10 is for explaining a situation when a PPDU is used for MU/OFDMA transmission.

FIGS. 11 and 12 are diagram for explaining another example of transmitting HE-LTF.

FIGS. 13 and 14 illustrate HE-LTF extension scheme according to the preferred embodiment of the present invention.

FIG. 15 illustrates another PPDU format for 11ax system.

FIGS. 16 and 17 illustrate information on for HE-LTF to be informed.

MODE FOR INVENTION

Figure 1:
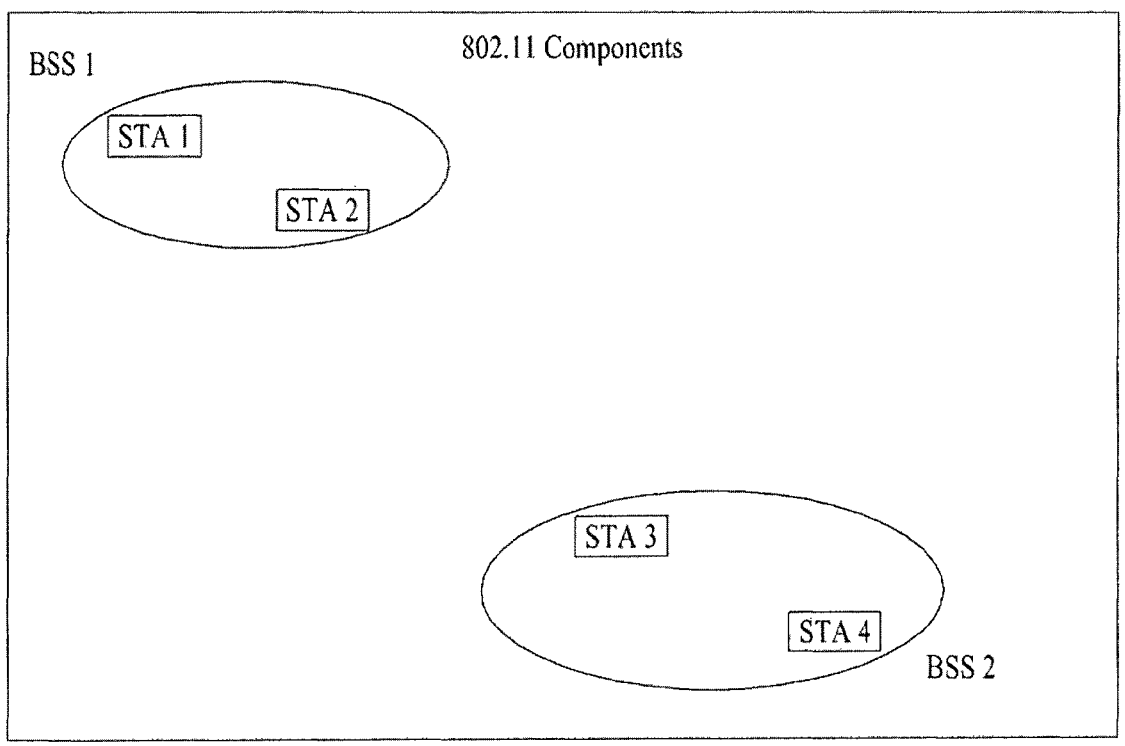
FIG. 1 exemplarily shows an IEEE 802.11 system according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the an that the present invention may be practiced without such specific details.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3$^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as (GSM (Global System for Mobile communication)/GPRS (General Packet Radio Service)/EDGE (Enhanced Data Rates for OSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on IEEE 802.11 systems. However, technical features of the present invention are not limited thereto.

WLAN System Structure

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
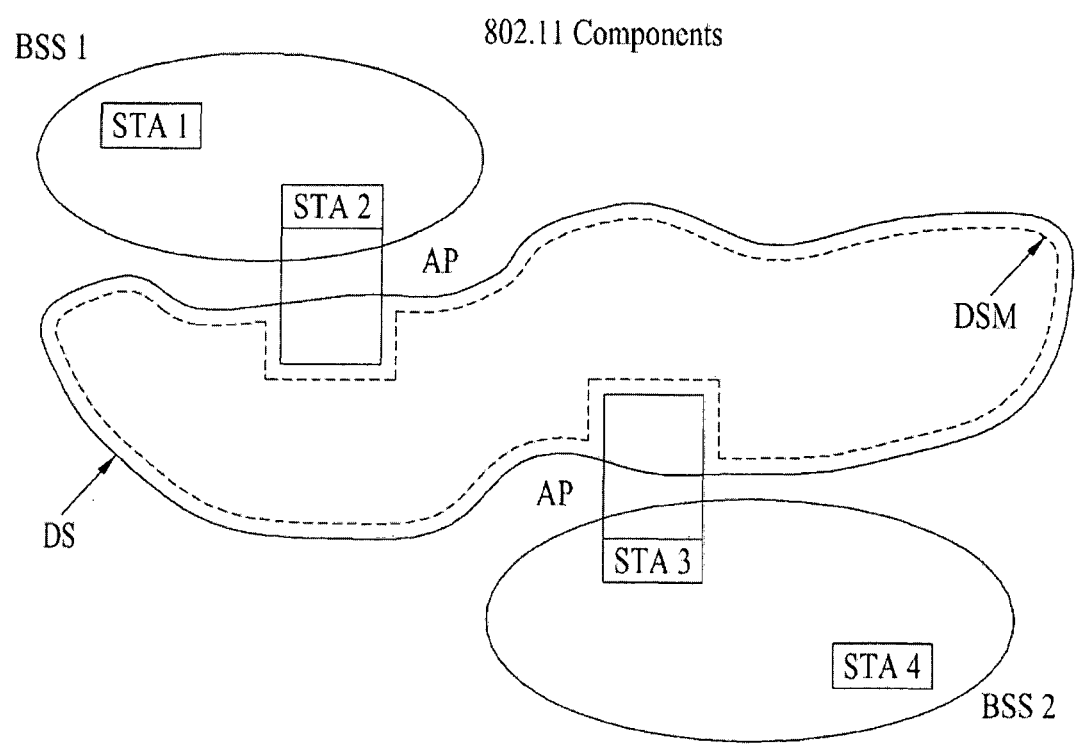
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by PHY performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
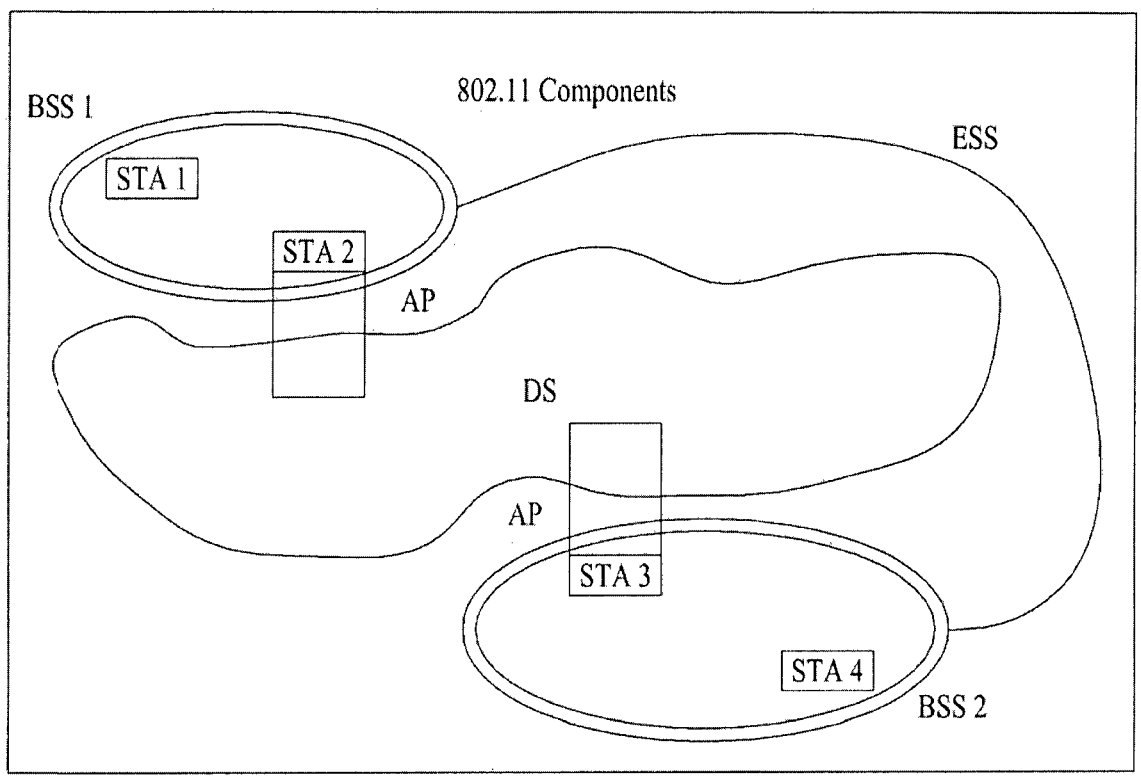
FIG. 3 is a diagram showing still another exemplary structure of an IEEE 802.11 system to which the present invention is applicable.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

Figure 4:
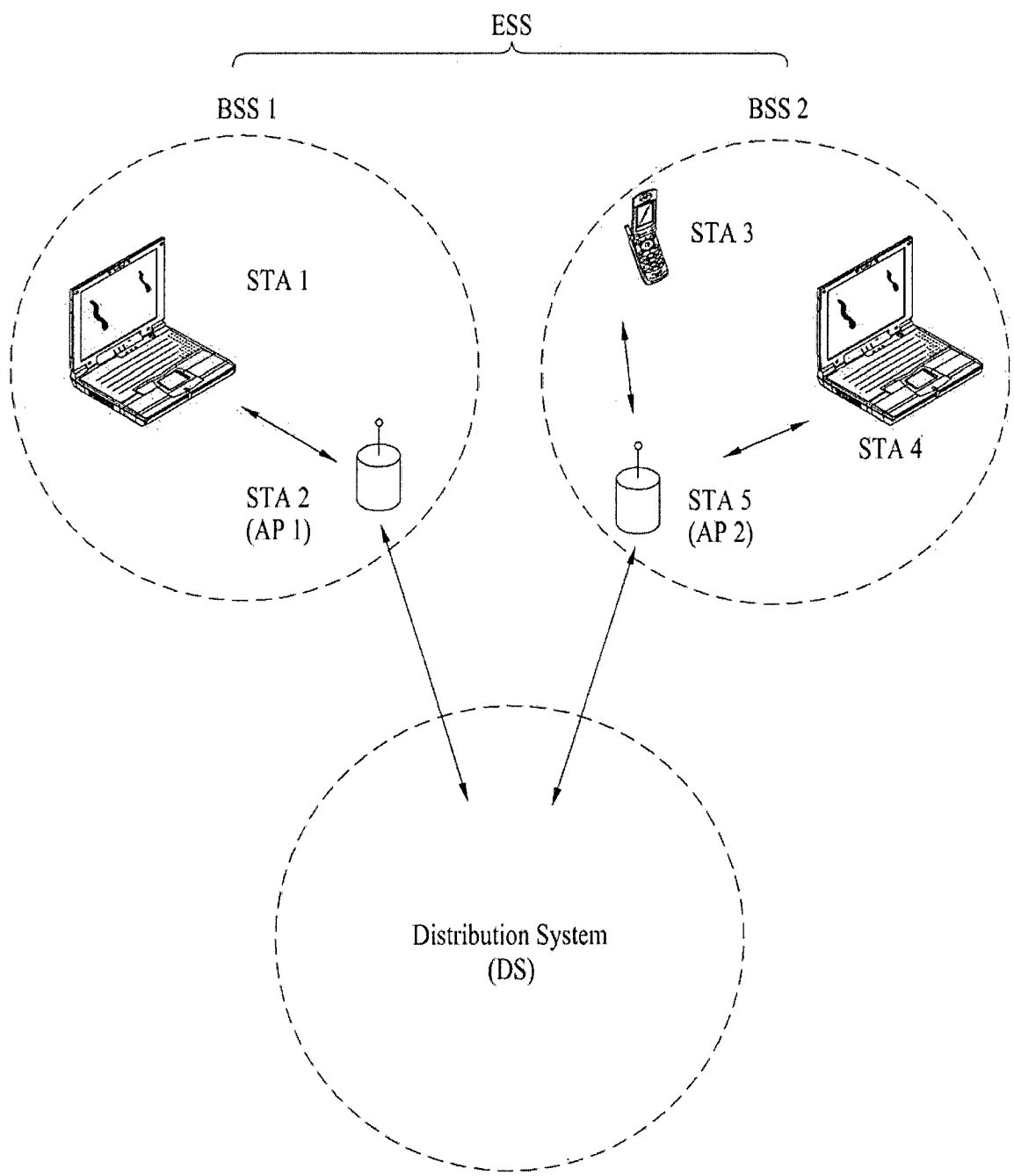
FIG. 4 is a diagram showing an exemplary structure of a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

PPDU Format

A Physical layer Protocol Data Unit (PPDU) is a data block that is generated in the physical (PHY) layer in IEEE 802.11 standard. In this paper, 'frame' refers to 'PPDU' unless there is opposite remark. However, the present invention may not be limited to the term 'PPDU' since the term of 'PPDU' can be changed during the standardization with the same meaning.

FIG. 5 illustrates an example of a proposed PPDU format for IEEE 802.11ax.

The PPDU may be is transmitted in a total of an 80-MHz bandwidth through four 20 MHz channels. The PPDU may be transmitted through at least one 20 MHz channel. This figure illustrates an example in which an 80-MHz band has been allocated to a single reception STA. The four 20 MHz channels may be allocated to different reception STAs.

The L-STF, the L-LTF, and the L-SIG may be transmitted in an Orthogonal Frequency Division Multiplexing (OFDM) symbol generated based on 64 Fast Fourier Transform (FFT) points (or 64 subcarriers) in each 20 MHz channel. They are for a legacy type of STA serving IEEE 802.11a/g/n/ac. FIG. 6 illustrates various PPDU formats according to IEEE 802.11a/g/n/ac for easy reference.

An HE-SIG A may include common control information that is in common received by STAs receiving a PPDU. The HE-SIG A may be transmitted in two or three OFDM symbols. The following table illustrates information included in the HE-SIG A. The names of fields or the number of bits is only illustrative, and all the fields are not essential.

TABLE 1

| FIELD | BIT | DESCRIPTION |
| --- | --- | --- |
| Bandwidth | 2 | Indicating a bandwidth in which a PPDU is transmitted. For example, 20 MHz, 40 MHz, 80 MHz or 160 MHz |
| Group ID | 6 | Indicating an STA or a group of STAs that will receive a PPDU |
| Stream information | 12 | Indicating the number or location of spatial streams for each STA, or the number or location of spatial streams for a group of STAs |

TABLE 1-continued

| FIELD | BIT | DESCRIPTION |
| --- | --- | --- |
| Uplink (UL) indication | 1 | Indicating whether a PPDU is destined to an AP (uplink) or to an STA (downlink) |
| MU indication | 1 | Indicating whether a PPDU is an SU-MIMO PPDU or an MU-MIMO PPDU |
| Guard Interval (GI) indication | 1 | Indicating whether a short GI or a long GI is used |
| Allocation information | 12 | Indicating a band or a channel (subchannel index or subband index) allocated to each STA in a bandwidth in which a PPDU is transmitted |
| Transmission power | 12 | Indicating a transmission power for each channel or each STA |

The HE-STF may be used to improve AGC estimation in MIMO transmission. The HE-LTF may be used to estimate an MIMO channel.

The HE-SIG B may include user-specific information that is required for each STA to receive its own data (i.e., a Physical Layer Service Data Unit (PSDU)). The HE-SIG B may be transmitted in one or two OFDM symbols. For example, the HE-SIG B may include information about the length of a corresponding PSDU and the Modulation and Coding Scheme (MCS) of the corresponding PSDU.

The L-STF, the L-LTF, the L-SIG, and the HE-SIG A may be duplicatively transmitted in a unit of 20 MHz channel. For example, when a PPDU is transmitted through four 20 MHz channels, the L-STF, the L-LTF, L-STG and the HE-SIG A are duplicately transmitted every 20 MHz channel.

An FFT size per unit frequency may be further increased from the HE-STF (or from the HE-SIG A). For example, 256 FFT may be used in a 20 MHz channel, 512 FFT may be used in a 40 MHz channel, and 1024 FFT may be used in an 80 MHz channel. If the FFT size is increased, the number of OFDM subcarriers per unit frequency is increased because spacing between OFDM subcarriers is reduced, but an OFDM symbol time may be increased. In order to improve efficiency, the length of a GI after the HE-STF may be configured to be the same as that of the GI of the HE-SIG A.

FIG. 7 illustrates another example of a proposed PPDU format for IEEE 802.11ax.

The PPDU formation is the same as that of FIG. 5 except that the HE-SIG B is placed behind the HE-SIG A. An FFT size per unit frequency may be further increased after the HE-STF (or the HE-SIG B).

Figure 8:
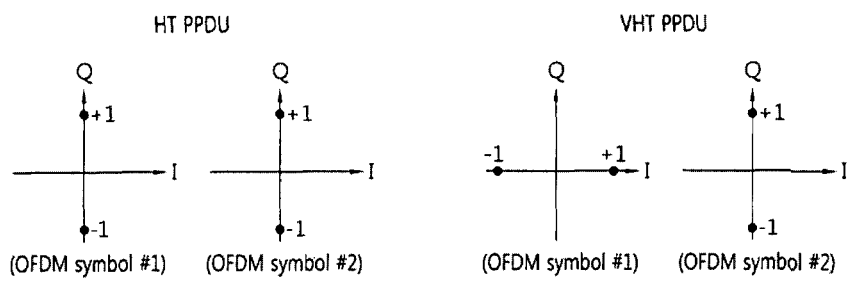
FIG. 8 illustrates yet another example of a proposed PPDU format for IEEE 802.11ax.

FIG. 8 illustrates yet another example of a proposed PPDU format for IEEE 802.11ax.

An HE-SIG B is placed behind an HE-SIG A. 20 MHz channels are allocated to different STAs (e.g., an STA1, an STA2, an STA3, and an STA4). The HE-SIG B includes information specific to each STA, but is encoded over the entire band. That is, the HE-SIG B may be received by all the STAs. An FFT size per unit frequency may be further increased after the HE-STF (or the HE-SIG B).

If the FFT size is increased, a legacy STA supports conventional IEEE 802.11a/g/n/ac is unable to decode a corresponding PPDU. For coexistence between a legacy STA and an HE STA, an L-STF, an L-LTF, and an L-SIG are transmitted through 64 FFT in a 20 MHz channel so that they can be received by a conventional STA. For example, the L-SIG may occupy a single OFDM symbol, a single OFDM symbol time may be 4 us, and a GI may be 0.8 us.

The HE-SIG A includes information that is required for an HE STA to decode an HE PPDU, but may be transmitted through 64 FFT in a 20 MHz channel so that it may be received by both a legacy STA and an HE STA. The reason for this is that an HE STA is capable of receiving conventional HT/VHT PPDUs in addition to an HE PPDU. In this case, it is required that a legacy STA and an HE STA distinguish an HE PPDU from an HT/VHT PPDU, and vice versa.

Figure 9:
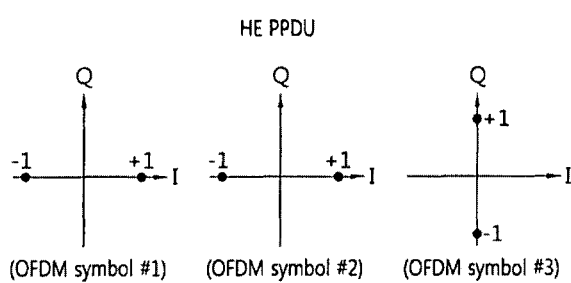
FIG. 9 illustrates an example of phase rotation for the classification of PPDUs.

FIG. 9 illustrates an example of phase rotation for the classification of PPDUs.

For the classification of PPDUs, the phase of the constellation of OFDM symbols transmitted after an L-STF, an L-LTF, and an L-SIG is used.

For the classification of HT/VHT PPDUs, the phases of three OFDM symbols transmitted after the L-SIG may be used in an HE-PPDU. The phases of the OFDM symbol#1 and the OFDM symbol#2 are not rotated, but the phase of the OFDM symbol#3 is counterclockwise rotated by 90 degrees. BPSK modulation is used in the OFDM symbol#1 and the OFDM symbol #2, and QBPSK modulation is used in the OFDM symbol#3. If the HE-SIG A is transmitted in three OFDM symbols after the L-SIG, it may be said that all the OFDM symbols #1/#2/#3 are used to send the HE-SIG A.

In the above explanation on proposed PPDU formats, it can be referred to as the PPDU has a first part ('L-part') for a first type of STA (i.e. legacy STA for IEEE 802.11a/g/n/ac) and a second part ('HE-part') for a second type of STA (i.e. 802.11ax STA). One symbol duration for some of HE-part (e.g. HE-STF/HE-LTF/Data) may be greater than 'X' times as FFT size increases. Preferably, 'X' can be 4, but it can be flexibly 2, 4 or the likes. And, information on 'one symbol duration' can be informed by HE SIG A.

Based on the above explanation, the transmission/reception scheme of the HE-LTF is explained.

FIG. 10 is for explaining a situation when a PPDU is used for MU/OFDMA transmission.

When PPDU is used for MU (Multiple User) transmission scheme or OFDMA (Orthogonal Frequency Divisional Multiple Access) scheme, the PPDU may include multiple HELTFs. In FIG. 10, the PPDU is used for OFDMA for user 1~user 4.

In IEEE 802.11ac system, LTF sequence is generated by using a P-matrix. And, the LTF sequence is determined based on bandwidth, and the LTF sequence is transmitted by multiplying it with P-matrix for distinction between and for channel estimation. The P-matrix for LTF transmission is determined as following.

[Equation 1]

$$P_{VHLIF} = \begin{cases} P_{4\times4}, N_{STS,total} \leq 4 \\ P_{6\times6}, N_{STS,total} = 5, 6 \\ P_{8\times8}, N_{STS,total} = 7, 8 \end{cases}$$

$$P_{4\times4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix},$$

$$P_{6\times6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix},$$

$$P_{8\times8} = \begin{bmatrix} P_{4\times4} & P_{4\times4} \\ P_{4\times4} & -P_{4\times4} \end{bmatrix},$$

Here, $w=\exp(-j2\pi/6)$

Also, the number of VHT-LTFs required for different number of space time streams is as following:

TABLE 2

| $N_{STS,total}$ | $N_{VHTLTF}$ |
|---|---|
| 1 | 1 |
| 2 | 2 |
| 3 | 4 |
| 4 | 4 |
| 5 | 6 |
| 6 | 6 |
| 7 | 8 |
| 8 | 8 |

In Table 2, $N_{STS,total}$ represents the number of total space time streams for each user, and $N_{VHT\_LTF}$ represents the number of symbols for LTF. So, according to the above legacy scheme, the symbol size of HE-LTF for user 1~user 4 may be different from each other as shown in FIG. 10.

In FIG. 10, HE-LTFs have $N_{\_HELTF}$ symbols as the maximum number of Nsts across users 1~4. Also, in 802.11ax system, AP can also intentionally signal a longer HE-LTF to boost channel estimation performance. If a user chooses P matrix by its $N_{sts}$, it is a problem how to fill up to $N_{HELTF}$ symbols. If the LTFs are not aligned in time domain, they might cause interference to data.

According to one embodiment of the present invention, when a first LTF having a first number of symbols length and a second LTF having a second number of symbols length, which is greater than the first number of symbols length, are used for the multiple LTFs, the first LTF is extended such that the first LTF and the second LTF have the same number of symbols length. The first/second LTF is only exemplary and it can be applied to different number of LTFs.

For example, when the number of space time streams for user 1, 2, 3 are 1, 2, 3, respectively. The number of LTF symbol would be 1, 2, 4, respectively. In this case, according to the present embodiment, the first LTF with the symbol length 1 can be repeated 4 times and the second LTF with the symbol length 2 can be repeated 2 times such that the 3 LTFs have the same symbol length of 4. It can be referred that the extension is up to the maximum number of LTF required for all users. Also, 'the extension' cannot be limited to 'repetition' as in this example.

In this embodiment, the transmission scheme of HE-LTF might not be limited to 'P-matrix based scheme'.

Figure 11:
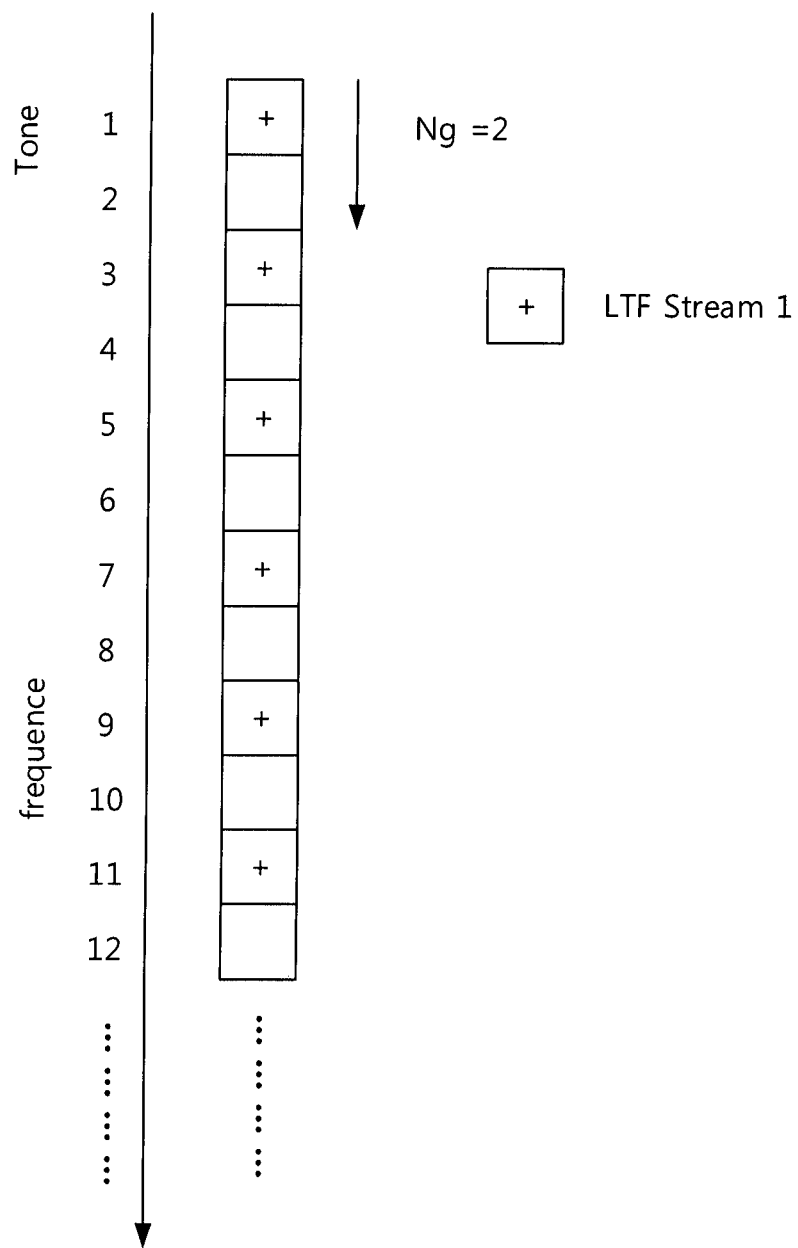

FIGS. 11 and 12 are diagram for explaining another example of transmitting HE-LTF.

In FIGS. 11 and 12, HE-LTF are transmitted not based on P-matrix. Rather, HE-LTF(s) is transmitted by specific mapping scheme in the frequency domain.

Referring to FIG. 11, when the NSS (number of spatial stream) is 1, the LTF sequence is not mapped to every tone (256 tone or total number of used tone) in 20 MHz. Rather, LTF sequence is mapped to every 2 tones as shown in FIG. 11. In FIG. 11, 'Ng' represents the gap between the tone on which LTF sequence is mapped. In this case, the HE-LTF can be power boosted based on the amount of empty tones. And this LTF signal is transmitted via 4× symbol structure (12.8 us).

Referring to FIG. 12, when the NSS is 2 or more, as in FIG. 11, the LTF sequence may not be mapped to every tone within the 20 MHz. For example, 'Ng' might be 2 as shown in FIG. 12. In this case, the LTF may have repeated pattern in time domain. In one example, only one part of the LTF with repetition pattern can be transmitted with CP (Cyclic prefix) addition thereto, thereby reducing signaling overhead. In this case, LTF signal is transmitted via 2× symbol structure (6.4 us).

Based on the HE-LTF generated as in FIGS. 11 and 12, the shorter LTF might be extended to the maximum number of symbols among users/streams.

As another example, the LTFs can be extended upto the least common multiple of LTF symbol lengths. For example, when the symbol lengths of LTF1 for user 1 is 2, LTF2 for user 2 is 4, LTF3 for user 3 is 6, the least common multiple of 2, 4 and 6 is 12. So, LTF 1/2/3 are extended upto 12 symbol length.

As further another example, the LTFs can be extended upto the maximum number of symbols even when the maximum number of symbols is not an integer multiple of shorter LTF. In the same example of the previous paragraph, the LTF 2 with the symbol length 4 is extended upto 6 by cyclic extension of the sequence. That is, when the sequence of LTF 2 is [a, b, c, d], it can be extended as [a, b, c, d, a, c] to have the symbol length of 6, the maximum number of symbols among all users.

P-Matrix Based Extension Scheme

As another example of the present invention, the HE-LTF can be extended based on P-matrix extension scheme. In this example, suppose STA1, STA2, and STA 3 have 2, 3 and 5 streams. In this example, HE-LTF 1 for STA 1 has 2 symbol length, HE-LTF 2 for STA 2 has 4 symbol length and HE-LTF 3 for STA 3 has 6 symbol length.

In this example, HE-LTFs (HE-LTF 1, 2 and 3) are acquired by using a P matrix having Nmax*Nmax structure. Here, Nmax represents the maximum number of symbol length among all HE-LTFs (i.e. 6 in this example). In this example, $P_{6\times6}$ would be used for HE-LTF 1, 2 and 3. When HE-LTF 1/2 uses full $P_{6\times6}$, the power efficiency would be degraded, since LTF symbol(s) not corresponding stream is(are) transmitted.

So, in one example, HE-LTF is generated based on only a corresponding part of P-matrix having Nmax*Nmax structure. That is, HE-LTF 1 may use $P_{2\times2}$ part among $P_{6\times6}$. The rest of the elements in $P_{6\times6}$ would be zero padded as following.

[Equation 2]

$$P_{6\times6} = \begin{bmatrix} 1 & -1 & 0 & 0 & 0 & 0 \\ 1 & -w^1 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix}. \quad 1$$

By this scheme, the overhead can be reduced, but the orthogonality of P matrix might be degraded since it does not use full P matrix sequence in a row.

In another example, HE-LTF is generated based on first Nsts rows of P-matrix having Nmax*Nmax structure. Nsts represents the number of LTF symbols for corresponding user. It can be represented as following.

[Equation 3]

$$P_{6\times6} = \begin{bmatrix} 1 & -1 & 1 & -1 & 1 & -1 \\ 1 & -w^1 & 1 & -w^1 & 1 & -w^1 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix}. \quad 1$$

HE-LTF 1 would use first 2 rows of $P_{6\times6}$, and it can be expressed as Equation 3.

FIGS. 13 and 14 illustrate HE-LTF extension scheme according to the preferred embodiment of the present invention.

When the maximum number of HE-LTF symbols is $N_{\_HELTF}$, and Nsts for user 1, 2, 3 and 4 are 1, 2, 3 and 4, each user applies the first $N_{sts}$ rows of a "super" P matrix. "Super" P matrix is determined in 802.11ac style by assuming size of $N_{HELTF} \times N_{HELTF}$. So, P matrix for each user is $N_{sts} \times N_{HELTF}$.

As shown in FIG. 14, when super P matrix is 6*6 P matrix, each user might user corresponding rows of that P matrix. The number of rows might be chosen based on Nsts as shown in FIG. 13. It might indicate that the number of symbols, N LTF, can be determined as following.

TABLE 3

| | Nss | | | | | | | |
|---|---|---|---|---|---|---|---|---|
| | 1 | 2 | 3 | 4 | 5 | 6 | 7 | 8 |
| N_LTF | 1 | 2 | 3 | 4 | 5 | 6 | 7 | 8 |

The above explained schemes for transmission of HE-LTF are mainly assumed as DL-OFDMA or DL-MU-MIMO where the PPDU is transmitted by AP to a plurality of STAs. But, these schemes can be similarly applied to UL-OFDMA or UL-MU-MIMO where the PPDU is transmitted by multiple STA to AP.

Signaling Scheme for HE-LTF

FIG. 15 illustrates another PPDU format for 1 lax system.

In FIG. 15, it is represented that L-part user 1× symbol structure, while data field use 4× structure. And, HE-STF may have 1× or 2× structure and HE-LTF may have 2× or 4× structure. Here, '2×', '4×' etc. represents the relative symbol length of one symbols.

In order to indicate information on the transmission scheme of HE-LTF, HE-SIG A or HE-SIG B can be used. As stated above, HE-SIG A informs common control information for all users. But, it is proposed that HE-SIG B also has common control information part and user-specific control information part. The symbol structure of HE-LTF (whether it is 2× or 4× structure) and the maximum number of LTF symbols for users can be informed by the common part of the HE-SIG B. And, information on Nsts (or NSS) for each user might be informed by the user specific part of HE-SIG B.

Figure 17:
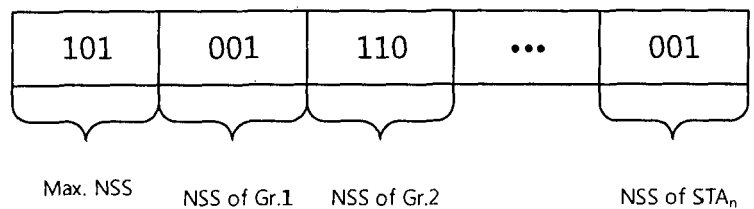

FIGS. 16 and 17 illustrate information on for HE-LTF to be informed.

When the maximum number of 8 steams is assumed, the bit length for max, NSS would be 3. In FIG. 16, the first '101' indicates the max. NSS is 5 and the rest of bit map indicates each NSS for users. The first '101' would be signaled via the common part of HE-SIG B (or HE-SIG A) and the rest of the field would be informed by the user specific part of HE-SIG B.

FIG. 17 is to reduce the signaling overhead by grouping STA with the same number of NSS. The information on grouping can be 2 or 3 bits, and the number of NSS is signaled for each group of STAs.

When a specific STA has smaller NSS than Nmax, that STA can operate as following.

STA may detect only a part of HE-LTF corresponding to the corresponding NSS. When the STA detects non-zero signals on the extended part of HE-LTF, the STA may aggregate or combine the signals with its own HE-LTF part to enhance the channel estimation performance.

In the above explanation, 'P-matrix' is assumed as the same P-matrix defined in IEEE 802.11ac standard. But, 'P-matrix' would be modified for the present invention, so it shall not be limited to the P-matrix in 802.11ac system. 'P-matrix' in the present invention is defined as a matrix with orthogonal/pseudo orthogonal sequences in each row. The structure of P-matrix is normally diagonal structure according to Nsts*Nsts, but it can be modified as Nsts*Nmax, as explained above.

Figure 18:
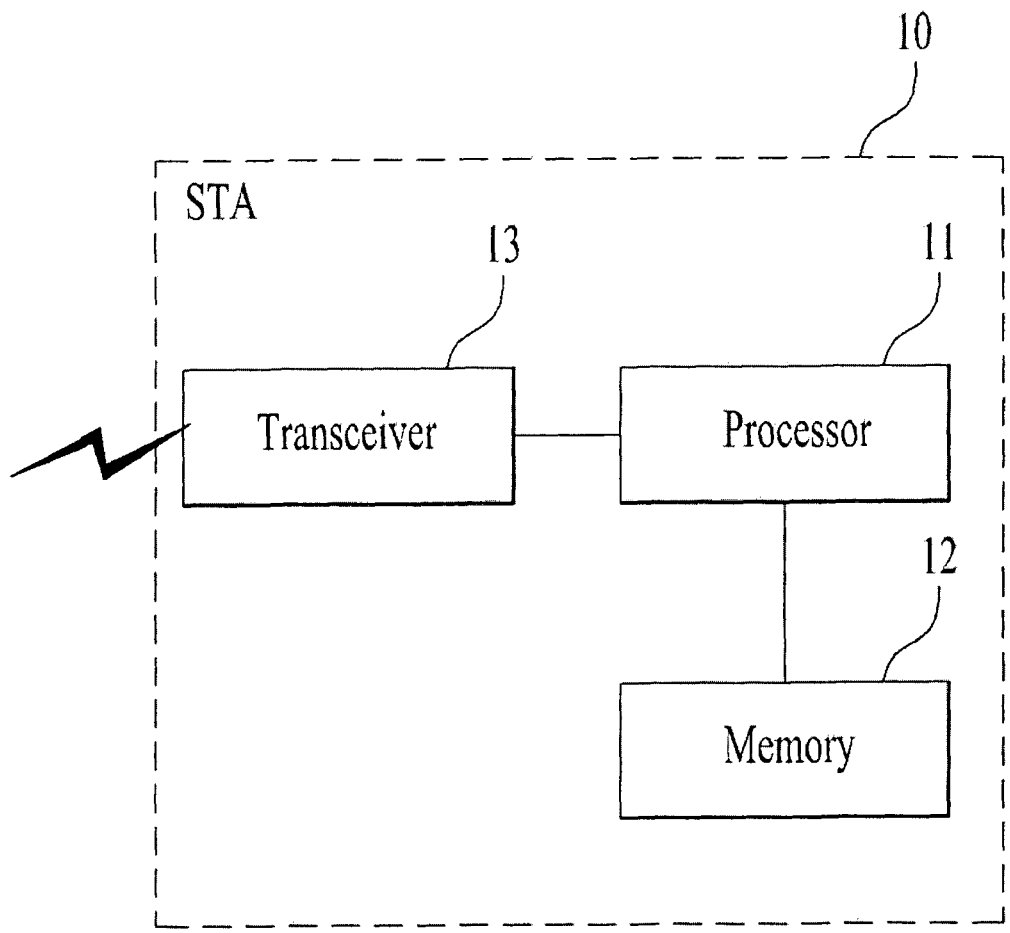
FIG. 18 is a block diagram of a wireless apparatus according to an embodiment of the present invention.

FIG. 18 is a block diagram of a wireless apparatus according to an embodiment of the present invention.

An STA 10 may include a processor 11, a memory 12, and a transceiver 13. The transceiver 13 may transmit/receive a wireless signal, for example, implement the physical layer of an IEEE 802 system. The processor 11 is connected to the transceiver 13 and implements the physical layer and/or the MAC layer of the IEEE 802 system. The processor 11 may be configured to perform operations according to the foregoing various embodiments of the present invention. Further, a module for performing operations according to the various embodiments of the present invention may be stored in the memory 12 and executed by the processor 11. The memory 12 may be located inside or outside the processor 11 and be connected to the processor 11 by a known means.

In FIG. 18, the STA 10 according to an embodiment of the present invention may be configured to perform a response process. The processor 11 may be configured to transmit a frame (PPDU) requiring a response frame to another STA through the transceiver 13.

The specific configuration of the above-described apparatus may be implemented so that the foregoing various embodiments of the present invention may be applied independently or two or more thereof may be applied simultaneously. A repeated description is omitted for clarity.

The embodiments of the present invention may be implemented by various means, for example, hardware, firmware, software, or a combination thereof.

In a hardware configuration, the methods according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and be executed by a processor. The memory unit may be located at the interior or exterior of the processor and may transmit and receive data to and from the processor via various known means.

INDUSTRIAL APPLICABILITY

While the various embodiments of the present invention have been described in the context of an IEEE 802.11 system, the present invention is also applicable to various mobile communication systems by the same scheme.

What is claimed is:

1. A method for an Access Point (AP) to communicate with multiple HE STAs (High Efficiency-Stations) in a HE WLAN (High Efficiency Wireless Local Area Network) system, the method comprising:
    configuring a HE multi-user (MU) frame to have a L-part for a legacy STA and a HE-part for the multiple HE STAs,
    wherein the legacy STA comprises a VHT (Very High Throughput) STA,
    wherein the HE-part includes multiple HE-LTFs,
    wherein a time domain length of the multiple HE-LTFs is determined based on a maximum length among each initial length of the multiple HE-LTF, and
    wherein a symbol duration of the multiple HE-LTFs is 'X' times longer than a symbol duration of the L-part, 'X' being an integer equal to or greater than 2; and
    transmitting the HE MU frame to the multiple HE STAs.

2. The method of claim 1, wherein 'X' is 2 or 4.

3. The method of claim 2, wherein the symbol duration of the multiple HE-LTFs is determined as 6.4 us or 12.8 us.

4. An Access Point (AP) configured to communicate with multiple HE STAs (High Efficiency-Stations) in a HE WLAN (High Efficiency Wireless Local Area Network) system, the AP comprising:
    a processor connected with an RF unit; and
    a memory storing instructions from the processor,
    wherein the processor configures a HE multi-user (MU) frame to have a L-part for a legacy STA and a HE-part for the multiple HE STAs,
    wherein the legacy STA comprises a VHT (Very High Throughput) STA,
    wherein the processor configures the HE-part to include multiple HE-LTFs,
    wherein the processor determines a time domain length of the multiple HE-LTFs based on a maximum length among each initial length of the multiple HE-LTFs, and
    wherein the processor configures a symbol duration of the multiple HE-LTFs as 'X' times longer than a symbol duration of the L-part, 'X' being an integer equal to or greater than 2.

5. The AP of claim 4, wherein 'X' is 2 or 4.

6. The AP of claim 5, wherein the processor determines the symbol duration of the multiple HE-LTFs as 6.4 us or 12.8 us.

7. The AP of claim 4, wherein the processor being configured to transmit the HE MU frame to the multiple HE STAs.

8. A method for a HE STA (High Efficiency-Station) to communicate with an Access Point (AP) in a HE WLAN (High Efficiency Wireless Local Area Network) system, the method comprising:
    receiving a HE multi-user (MU) frame having a L-part for a legacy STA and a HE-part for the HE STA,
    wherein the legacy STA comprises a VHT (Very High Throughput) STA,
    wherein the HE-part includes multiple HE-LTFs,
    wherein a time domain length of the multiple HE-LTFs is determined based on a maximum length among each initial length of the multiple HE-LTFs, and wherein a symbol duration of the multiple HE-LTFs is 'X' times longer than a symbol duration of the L-part, 'X' being an integer equal to or greater than 2; and
estimating an MIMO (Multi-Input Multi-Output) channel based on at least one of the multiple HE-LTFs.

9. The method of claim 8, wherein 'X' is 2 or 4.

10. The method of claim 9, wherein the symbol duration of the multiple HE-LTFs is determined as 6.4 us or 12.8 us.

* * * * *